(12) United States Patent
Yamashita et al.

(10) Patent No.: US 12,078,789 B2
(45) Date of Patent: Sep. 3, 2024

(54) CONFOCAL MICROSCOPE UNIT AND CONFOCAL MICROSCOPE

(71) Applicant: HAMAMATSU PHOTONICS K.K., Hamamatsu (JP)

(72) Inventors: Jiro Yamashita, Hamamatsu (JP); Yasuyuki Tanabe, Hamamatsu (JP); Shunsuke Matsuda, Hamamatsu (JP); Hirotoshi Terada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 330 days.

(21) Appl. No.: 17/442,163

(22) PCT Filed: Mar. 26, 2020

(86) PCT No.: PCT/JP2020/013801
§ 371 (c)(1),
(2) Date: Sep. 23, 2021

(87) PCT Pub. No.: WO2020/196784
PCT Pub. Date: Oct. 1, 2020

(65) Prior Publication Data
US 2022/0179185 A1    Jun. 9, 2022

(30) Foreign Application Priority Data
Mar. 28, 2019   (JP) ................. 2019-062976

(51) Int. Cl.
*G02B 21/16* (2006.01)
*G01N 21/64* (2006.01)
(Continued)

(52) U.S. Cl.
CPC ..... *G02B 21/0048* (2013.01); *G01N 21/6458* (2013.01); *G02B 21/0032* (2013.01);
(Continued)

(58) Field of Classification Search
CPC .... G02B 21/16; G02B 21/00; G02B 21/0048; G02B 21/6458; G02B 21/0032;
(Continued)

(56) References Cited

U.S. PATENT DOCUMENTS 8,643,947 B2 *   2/2014   Nezu ................. G02B 21/0044
                                                              359/368
2004/0150880 A1   8/2004   Nakata et al.
(Continued)

FOREIGN PATENT DOCUMENTS

CN        1886689 A      12/2006
CN      106980174 A       7/2017
(Continued)

OTHER PUBLICATIONS

International Preliminary Report on Patentability mailed Oct. 7, 2021 for PCT/JP2020/013801.
(Continued)

*Primary Examiner* — Jurie Yun
(74) *Attorney, Agent, or Firm* — Faegre Drinker Biddle & Reath LLP

(57) ABSTRACT

A confocal microscope unit according to an embodiment includes: a first subunit which includes a light source, a pinhole plate, and a photodetector; a second subunit which includes a light source, a pinhole plate, and a photodetector; a scan mirror which scans excitation light output from the first and second subunits on a sample via a microscope optical system and guides fluorescence generated from the sample in response to the excitation light and focused by the microscope optical system to the first and second subunits; and a main housing which is attachable to a connection port and to which the scan mirror, the first subunit, and the second subunit are fixed, wherein the first subunit and the second subunit are disposed in the main housing so that
(Continued)

incident angles of two excitation lights to the scan mirror are displaced from each other by a predetermined angle.

9 Claims, 8 Drawing Sheets

(51) Int. Cl.
*G02B 21/00* (2006.01)
*G02B 26/08* (2006.01)
*G02B 27/14* (2006.01)

(52) U.S. Cl.
CPC ......... *G02B 21/0076* (2013.01); *G02B 21/16* (2013.01); *G02B 26/0833* (2013.01); *G02B 27/14* (2013.01)

(58) Field of Classification Search
CPC ............ G02B 21/0064; G02B 21/0076; G02B 26/08; G02B 26/0833; G02B 27/14; G02B 27/145; G01N 21/64; G01N 21/6458; G01N 2021/6417
See application file for complete search history.

(56) References Cited

U.S. PATENT DOCUMENTS

| | | |
|---|---|---|
| 2011/0119034 A1 | 5/2011 | Liedtke et al. |
| 2013/0015370 A1 | 1/2013 | Damaskinos et al. |
| 2013/0193345 A1 | 8/2013 | Nishiwaki |
| 2015/0323775 A1 | 11/2015 | Suzuki |

FOREIGN PATENT DOCUMENTS

| | | |
|---|---|---|
| EP | 2317363 A2 | 5/2011 |
| EP | 2322969 A1 | 5/2011 |
| JP | H06-167654 A | 6/1994 |
| JP | H10-206742 A | 8/1998 |
| JP | 2003-185927 A | 7/2003 |
| JP | 2006-064384 A | 3/2006 |
| JP | 2006-133499 A | 5/2006 |
| JP | 2008-203417 A | 9/2008 |
| JP | 2009-104136 A | 5/2009 |
| JP | 2009-116082 A | 5/2009 |
| JP | 2009-198980 A | 9/2009 |
| JP | 2011-090248 A | 5/2011 |
| JP | 2013-225061 A | 10/2013 |
| JP | 2017-535816 A | 11/2017 |
| WO | WO-2016/075195 A1 | 5/2016 |
| WO | WO-2017/145230 A1 | 8/2017 |

OTHER PUBLICATIONS

International Preliminary Report on Patentability mailed Oct. 7, 2021 for PCT/JP2020/013799.

* cited by examiner

CONFOCAL MICROSCOPE UNIT AND CONFOCAL MICROSCOPE

TECHNICAL FIELD

The present disclosure relates to a confocal microscope unit constituting a confocal microscope and a confocal microscope.

BACKGROUND ART

Conventionally, a confocal microscope capable of obtaining an optical sectioning image of a specimen to be observed with high resolution has been known. For example, Patent Literature 1 below discloses a microscope connection unit including a microscope connection port which is connected to a microscope, a stimulation unit which irradiates a specimen with light, an observation unit which detects light emitted from the specimen, and an optical path synthesizer which synthesizes optical paths optically connecting the microscope to the stimulation unit and the observation unit. In this microscope connection unit, the same observation unit is provided with an optical system which guides light emitted from a plurality of light sources and a dichroic mirror, a confocal pinhole, and a photomultiplier tube which detect fluorescence generated in response to the light for each of a plurality of wavelengths. In such a configuration, imaging in a plurality of wavelength regions is realized with the same device by using excitation light of a plurality of wavelengths and detecting fluorescence generated in response to the excitation light.

Further, as a device for imaging a fluorescence sample by using excitation light of a different wavelength, a laser scanner device described in Patent Literature 2 below is also known. According to this laser scanner device, two laser beams with different wavelengths concentrated on the sample are spatially separated and the two emission beams induced by those laser beams are also spatially separated and guided toward two detectors.

CITATION LIST

Patent Literature

Patent Literature 1: Japanese Unexamined Patent Publication No. 2011-90248
Patent Literature 2: Japanese Unexamined Patent Publication No. 2009-104136

SUMMARY OF INVENTION

Technical Problem

Since the wavelength distribution of fluorescence emitted by a fluorescence material is generally wide, the wavelength distribution of the fluorescence emitted from each fluorescence material may overlap when observing a sample containing a plurality of fluorescence materials. When simultaneously detecting the fluorescence emitted from such a sample, there is a problem that not only the fluorescence from the target fluorescence material but also the fluorescence from other fluorescence materials is detected by the same detector. In general, such a problem is called bleed-through.

In the laser scanner device described in Patent Literature 2, bleed-through is reduced by spatially separating and detecting a plurality of fluorescences using a wedge-shaped dichroic mirror, but this technique is not easily applied to a confocal microscope using a scan mirror.

Embodiments have been made in view of such a problem and an object is to provide a confocal microscope unit capable of performing fluorescence imaging with less bleed-through in a plurality of wavelength regions by a simple configuration.

Solution to Problem

A confocal microscope unit according to an embodiment of the present disclosure is a confocal microscope unit attached to a connection port of a microscope including a microscope optical system to constitute a confocal microscope, the confocal microscope unit including: a first subunit including a light source outputting first excitation light, a first aperture limiting a luminous flux of first fluorescence generated from a sample to be observed in response to the first excitation light, and a first photodetector detecting the first fluorescence having passed through the first aperture; a second subunit including a light source outputting second excitation light, a second aperture limiting a luminous flux of second fluorescence generated from the sample in response to the second excitation light, and a second photodetector detecting the second fluorescence having passed through the second aperture; a scan mirror configured to scan the excitation light output from the first and second subunits on the sample via the microscope optical system and guide the fluorescence generated from the sample in response to the excitation light to the first and second subunits; and a main housing configured to be attachable to the connection port and to which the scan mirror, the first subunit, and the second subunit are fixed, wherein the first subunit and the second subunit are disposed in the main housing so that an incident angle of the first excitation light to the scan mirror is displaced from an incident angle of the second excitation light to the scan mirror by a predetermined angle.

According to the above-described embodiment, the first excitation light output from the first subunit is scanned on the sample via the scan mirror, the first fluorescence generated from the sample in response to the first excitation light is incident to the first subunit via the scan mirror, and an image thereof is formed on the first aperture in the first subunit and is detected by the first photodetector. In addition, the second excitation light output from the second subunit is scanned on the sample via the scan mirror, the second fluorescence generated from the sample in response to the second excitation light is incident to the second subunit via the scan mirror, and an image thereof is formed on the second aperture in the second subunit and is detected by the second photodetector. Here, since the scan mirror and the first and second subunits are fixed to the main housing and the incident angles of the first and second excitation lights from the first and second subunits to the scan mirror are displaced from each other by a predetermined angle, it is possible to separate the spots of the first and second excitation lights scanned on the sample. As a result, it is possible to separate the first and second fluorescence beams guided to the first and second subunits. Accordingly, it is possible to observe a plurality of fluorescence images while reducing bleed-through. In addition, it is possible to simplify the configuration of the whole device by adopting a configuration in which the sample is scanned by the scan mirror.

Alternatively, another embodiment of the present disclosure is a confocal microscope including the above-described confocal microscope unit and a microscope with a connection port to which the microscope optical system and the confocal microscope unit are attached. According to such a confocal microscope, it is possible to easily perform confocal imaging at desired excitation and fluorescence wavelengths.

Advantageous Effects of Invention

According to an aspect of the present disclosure, it is possible to realize fluorescence imaging by a plurality of fluorescences while reducing bleed-through by a simple configuration.

DESCRIPTION OF EMBODIMENTS

Figure 1:
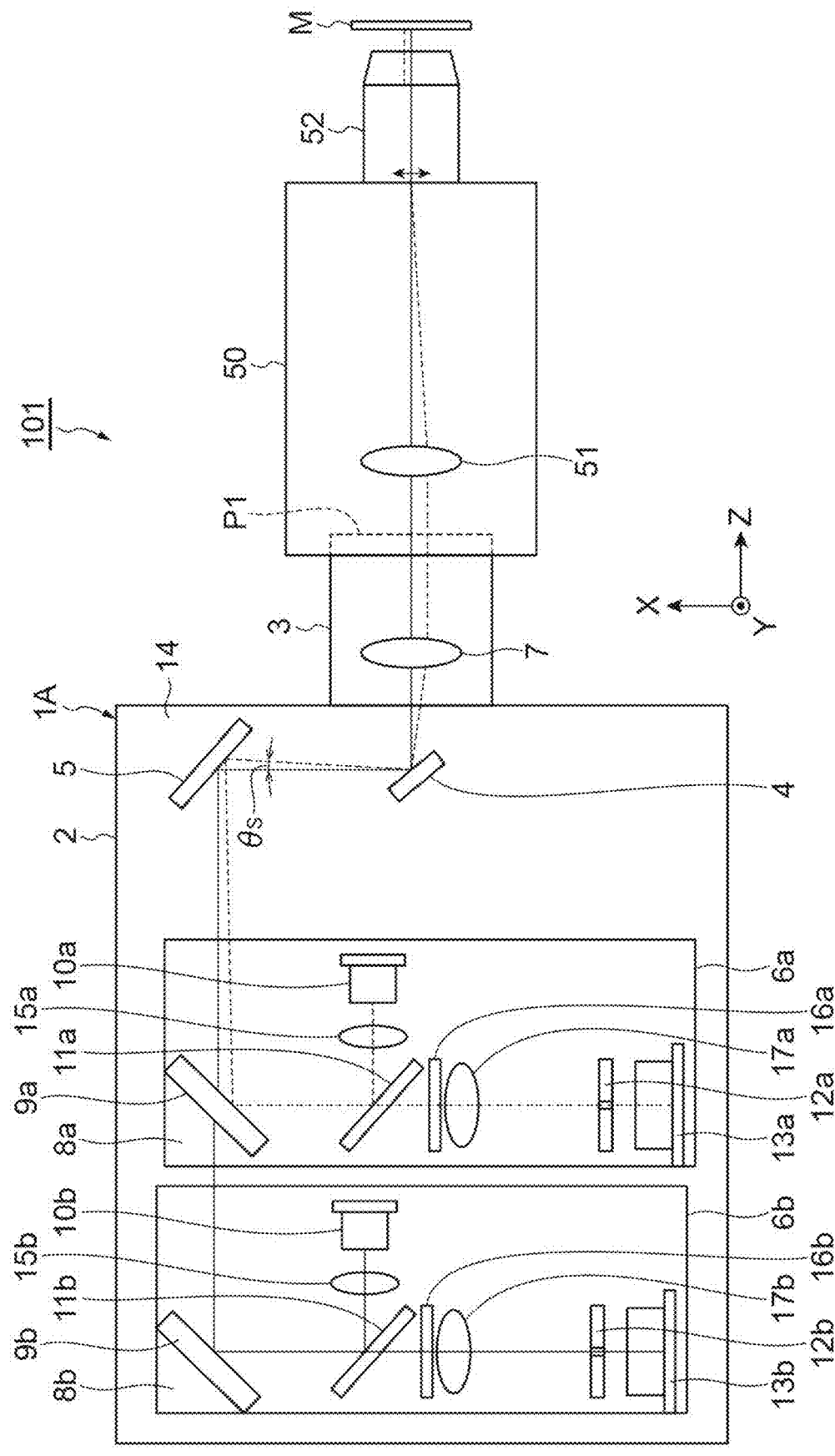
FIG. 1 is a schematic configuration diagram of a confocal microscope 101 according to a first embodiment.

Hereinafter, an embodiment of the present disclosure will be described in detail with reference to the accompanying drawings. Additionally, in the description, the same reference numerals will be used for the same elements or elements having the same function and redundant description will be omitted.

First Embodiment

FIG. 1 is a schematic configuration diagram of a confocal microscope 101 according to a first embodiment. The confocal microscope 101 shown in FIG. 1 constitutes a confocal microscope that acquires an image enabling the construction of an optical sectioning image of a sample M to be observed and is configured such that a confocal microscope unit 1A is connected to a connection port P1 used for connection to an external unit of a microscope 50. The confocal microscope unit 1A according to the first embodiment is a device that irradiates the sample M disposed on a stage or the like of the microscope 50 via a microscope optical system such as an imaging lens 51 and an objective lens 52 inside the microscope 50 with excitation light, images and receives (detects) fluorescence generated from the sample M in response to the excitation light via the microscope optical system of the microscope 50, generates an optical sectioning image, and outputs the image.

Specifically, the confocal microscope unit 1A includes a main housing 2, a lens barrel 3 which constitutes a part of the main housing 2 and is removably connected to the connection port P1 of the microscope 50, a scan mirror 4, a fixed mirror 5, and first and second subunits 6a and 6b which are fixed into the main housing 2, and a scan lens 7 which is fixed into the lens barrel 3. Hereinafter, each component of the confocal microscope unit 1A will be described in detail.

The scan lens 7 in the lens barrel 3 is an optical element having a function of relaying a reflection surface of the scan mirror 4 to a pupil position of the objective lens 52 and forming a spot on a primary image plane of the microscope optical system of the microscope 50. As a result, the scan mirror 4 and the exit pupil of the objective lens 52 have a conjugate relationship, that is, an imaging relationship. The scan lens 7 irradiates the sample M by guiding the excitation light scanned by the scan mirror 4 to the microscope optical system and guides the fluorescence generated from the sample M in response to the excitation light to the scan mirror 4.

The scan mirror 4 in the main housing 2 is, for example, an optical scanning element such as a micro electro mechanical system (MEMS) mirror configured so that a reflector can be tilted in two axes. The scan mirror 4 has a function of scanning the excitation light output from the first and second subunits 6a and 6b on the sample M by continuously changing a reflection angle and guiding the fluorescence generated in response to the excitation light to the first and second subunits 6a and 6b.

The fixed mirror 5 is an optical reflecting element fixed into the main housing 2, reflects the excitation light output from the first and second subunits 6a and 6b to the scan mirror 4, and reflects the fluorescence reflected by the scan mirror 4 to the first and second subunits 6a and 6b coaxially with the excitation light.

The first subunit 6a includes a base plate 8a and a dichroic mirror (first optical mirror) 9a, a light source 10a, a collimated lens 15a, a dichroic mirror 11a, a barrier filter 16a, a condenser lens 17a, a pinhole plate (first aperture) 12a, and a photodetector (first photodetector) 13a which are disposed on the base plate 8a.

The dichroic mirror 9a is a beam splitter which is fixed in the reflection direction of the fluorescence of the fixed mirror 5 and has a property of reflecting first excitation light of a wavelength $\lambda_1$ irradiated by the first subunit 6a and first fluorescence of a wavelength range $\Delta\lambda_1$ generated from the sample M in response to the first excitation light and transmitting light of a wavelength longer than those of the first excitation light and the first fluorescence. The dichroic mirror 11a is a beam splitter which is provided in the reflection direction of the first fluorescence of the dichroic mirror 9a and has a property of transmitting the first fluorescence of the wavelength range $\Delta\lambda_1$ and reflecting the first excitation light of the wavelength $\lambda_1$ shorter than that of the wavelength range $\Delta\lambda_1$. The light source 10a is a light emitting element (for example, laser diode) outputting the first excitation light (for example, laser beam) of the wavelength $\lambda_1$ and is disposed so that the first excitation light is reflected toward the dichroic mirror 9a coaxially with the first fluorescence by the dichroic mirror 11a. The collimated lens 15a converts the first excitation light output from the light source 10a into parallel light.

The barrier filter 16a is a filter member that is provided adjacent to the dichroic mirror 11a and cuts noise light other than the first fluorescence transmitted by the dichroic mirror 11a. The condenser lens 17a concentrates the first fluorescence transmitted through the barrier filter 16a on the pinhole of the pinhole plate 12a. The pinhole plate 12a is an aperture which is disposed so that a pinhole position coincides with a conjugate position of a spot of the first excitation light of the sample M and limits the luminous flux of the first fluorescence and constitutes a confocal optical system along with the light source 10a and the like. This pinhole plate 12a has a pinhole diameter that can be adjusted from the outside and the resolution of the image detected by the photodetector 13a and the signal intensity of the image can be changed.

The photodetector 13a is disposed so that a detection surface is opposed to the pinhole plate 12a and receives and detects the first fluorescence having passed through the pinhole plate 12a. Additionally, the photodetector 13a is a photomultiplier tube, a photodiode, an avalanche photodiode, a multi-pixel photon counter (MPPC), a hybrid photo detector (HPD), an area image sensor, or the like.

The second subunit 6b includes the same components as those of the first subunit 6a.

That is, the second subunit 6b includes a base plate 8b, a dichroic mirror (second optical mirror) 9b, a light source 10b, a collimated lens 15b, a dichroic mirror 1lb, a barrier filter 16b, a condenser lens 17b, a pinhole plate (second aperture) 12b, and a photodetector (second photodetector) 13b.

The dichroic mirror 9b has a property of reflecting second excitation light of a wavelength $\lambda_2$ ($>\lambda_1$) irradiated by the second subunit 6b and second fluorescence of a wavelength range $\Delta\lambda_2$ generated from the sample M in response to the second excitation light and transmitting light of a wavelength longer than those of the second excitation light and the second fluorescence. Additionally, this dichroic mirror 9b may be replaced with a simple reflection mirror having no wavelength selectivity. The dichroic mirror 11b has a property of transmitting the second fluorescence of the wavelength range $\Delta\lambda_2$ and reflecting the second excitation light of the wavelength $\lambda_2$ shorter than the wavelength range $\Delta\lambda_2$. The light source 10b is a light emitting element which outputs the second excitation light of the wavelength $\lambda_2$. The collimated lens 15b converts the second excitation light output from the light source 10b into parallel light.

The barrier filter 16b is a filter member that is provided adjacent to the dichroic mirror 11b and cuts noise light other than the second fluorescence. The condenser lens 17b concentrates the second fluorescence transmitted through the barrier filter 16b on the pinhole of the pinhole plate 12b. The pinhole plate 12b is an aperture which is disposed so that a pinhole position coincides with a conjugate position of a spot of the second excitation light of the sample M and limits the luminous flux of the second fluorescence.

The photodetector 13b is disposed so that a detection surface is opposed to the pinhole plate 12b and receives and detects the second fluorescence having passed through the pinhole plate 12b. Additionally, the photodetector 13b is a photomultiplier tube, a photodiode, an avalanche photodiode, a multi-pixel photon counter (MPPC), a hybrid photo detector (HPD), an area image sensor, or the like.

The arrangement of the first and second subunits 6a and 6b of the above-described configurations will be described. In the following description, a direction along the optical axis of the scan lens 7 is referred to as a Z axis, a direction perpendicular to the Z axis and aligned along the base plates 8a and 8b of the subunits 6a and 6b is referred to as an X axis, and a direction perpendicular to the Z axis and the X axis is referred to as a Y axis.

The first and second subunits 6a and 6b are fixed onto the base plate 14 constituting the main housing 2 so that the first and second subunits are arranged in this order along the light guiding direction (the Z-axis direction) of the first and second fluorescences formed by the scan mirror 4 and the fixed mirror 5 to be away from the fixed mirror 5 and the dichroic mirrors 9a and 9b are located on the optical paths of the first and second fluorescences. Specifically, the second subunit 6b is disposed to be shifted from the first subunit 6a in a direction (the X-axis direction) substantially perpendicular to the light guiding direction of the first fluorescence based on the center positions of the dichroic mirrors 9a and 9b. Further, the installation angle of the dichroic mirror 9a is set so that the reflected first excitation light is incident to the center of the reflection surface of the scan mirror 4 via the fixed mirror 5. Similarly, the installation angle of the dichroic mirror 9b is set so that the reflected second excitation light is incident to the center of the reflection surface of the scan mirror 4 via the dichroic mirror 9a and the fixed mirror 5. With such an arrangement, the incident angle of the first excitation light to the scan mirror 4 is set to be displaced from the incident angle of the second excitation light to the scan mirror 4 by a predetermined angle $\theta_S$.

The shift amount of the above-described first and second subunits 6a and 6b in the X-axis direction and the installation angles of two dichroic mirrors 9a and 9b are set to satisfy the following conditions. That is, the above-described predetermined angle $\theta_S$ is set to an angle at which the Airy disc of the spot of the first excitation light incident onto the sample M does not overlap the Airy disc of the spot of the second excitation light incident onto the sample M. In general, the diameter $\phi$ of the Airy disc is calculated by the following formula (1) on the assumption that the wavelength of the incident excitation light is $\lambda$ and the numerical aperture of the objective lens 52 is NA.

$$\phi = 1.22 \times \lambda / NA \tag{1}$$

Therefore, the minimum value $\Delta d_{min}$ of the displacement amount $\Delta d$ between the spots of the first and second excitation lights on the sample M for preventing the spots of two excitation lights from overlapping can be calculated by the following formula (2).

$$\Delta d_{min} = \phi_1/2 + \phi_2/2, \tag{2}$$
$$\phi_1 = 1.22 \times \lambda_1/NA,$$
$$\phi_2 = 1.22 \times \lambda_2/NA$$

Here, since the scan mirror 4 and the exit pupil of the objective lens 52 are in a conjugate relationship, the luminous fluxes of the first and second excitation lights incident on the center of the reflection surface of the scan mirror 4 are incident on the center of the exit pupil of the objective lens 52. At that time, the incident angle on the objective lens 52 changes according to the imaging magnification of the scan lens 7. Since the objective lens 52 is a telecentric lens, the main rays of the first and second excitation lights on the sample M are in the direction (the Z-axis direction) parallel to the optical axis of the objective lens 52 and the positions of the spots of two excitation lights are shifted on the sample M in accordance with the incident angle on the exit pupil. In order to prevent the spots of two excitation lights from overlapping on the sample M, the angle $\theta_S$ of the displacement of the incident angle on the scan mirror 4 is set to be equal to or larger than an angle $\theta_{Smin}$ calculated by the following formula (3).

$$\theta_{Smin} = \arctan(\Delta d_{min}/f)/mags \quad (3)$$

Additionally, mags is the magnification of the scan lens 7 and f is the focal length of the objective lens 52.

Further, the pinhole diameters of the pinhole plates 12a and 12b of the subunits 6a and 6b are set to be smaller than the values of the Airy units ($AU_1$, $AU_2$) calculated by the following formulas (4) and (5). By setting in this way, crosstalk between wavelengths in the fluorescence image can be effectively prevented.

$$AU_1 = mag_t \times \phi_1 \quad (4)$$

$$AU_2 = mag_t \times \phi_2 \quad (5)$$

Here, $mag_t$ indicates the total magnification of the optical system for observing fluorescence.

Figure 2:
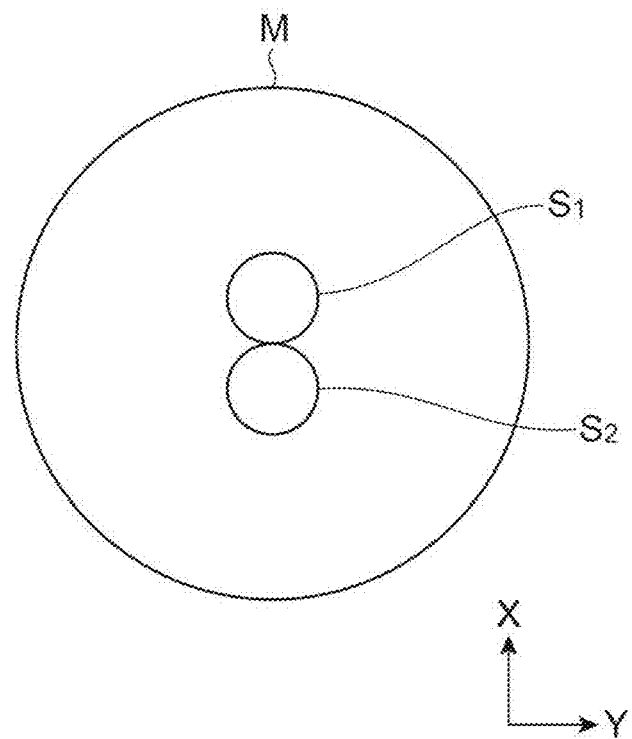
FIG. 2 is a diagram showing a distribution of a range $S_1$ of an Airy disc of a spot of first excitation light on a sample M and a range $S_2$ of an Airy disc of a spot of second excitation light on the sample M formed by the confocal microscope 101.
Figure 3:
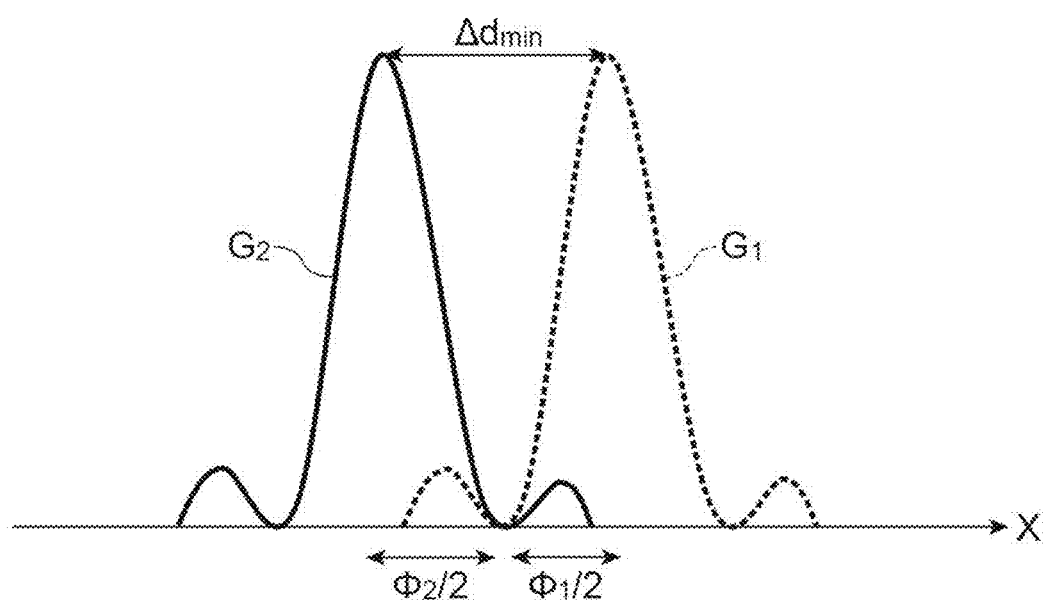
FIG. 3 is a graph showing a one-dimensional light intensity distribution along an X-axis direction of each of the first excitation light and the second excitation light irradiated on the sample M by the confocal microscope 101.

FIG. 2 shows a distribution of a range $S_1$ of an Airy disc of a spot of the first excitation light and a range $S_2$ of an Airy disc of a spot of the second excitation light on the sample M formed by the confocal microscope 101 and FIG. 3 shows a one-dimensional light intensity distribution along the X-axis direction of the first excitation light and the second excitation light irradiated on the sample M by the confocal microscope 101. In this way, since the ranges $S_1$ and $S_2$ of the spots of the first and second excitation lights formed on the sample M do not overlap each other, the intensity distributions of two excitation lights on the sample M are separated. As a result, the interference between the fluorescence images in the two wavelength regions caused by the two excitation lights is reduced.

According to the above-described confocal microscope unit 1A, the first excitation light output from the first subunit 6a is scanned on the sample M via the scan mirror 4, the first fluorescence generated from the sample M in response to the first excitation light is incident to the first subunit 6a via the scan mirror 4, and an image thereof is formed on the pinhole plate 12a in the first subunit 6a and is detected by the photodetector 13a. In addition, the second excitation light output from the second subunit 6b is scanned on the sample M via the scan mirror 4, the second fluorescence generated from the sample M in response to the second excitation light is incident to the second subunit 6b via the scan mirror 4, and an image thereof is formed on the pinhole plate 12b in the second subunit 6b and is detected by the photodetector 13b. Here, since the scan mirror 4 and the first and second subunits 6a and 6b are fixed to the main housing 2 and the incident angles of the first and second excitation lights from the first and second subunits 6a and 6b to the scan mirror 4 are displaced from each other by the predetermined angle $\theta_S$, it is possible to separate the spots of the first and second excitation lights scanned on the sample M. As a result, it is possible to separate the first and second fluorescence beams guided to the first and second subunits 6a and 6b. Accordingly, it is possible to observe a plurality of fluorescence images while reducing bleed-through. In addition, since a configuration of scanning the sample M by the scan mirror 4 is adopted, it is possible to simplify the configuration of the entire device.

Alternatively, the confocal microscope 101 is a confocal microscope including the above-described confocal microscope unit 1A and the microscope 50 with the connection port P1 to which the microscope optical system and the confocal microscope unit 1A are attached. According to such a confocal microscope 101, it is possible to easily perform confocal imaging using the microscope 50 which is a general optical microscope.

In the confocal microscope unit 1A according to the above-described embodiment, the dichroic mirrors 9a and 9b are disposed in the main housing 2 so that the incident angles of the first and second excitation lights on the scan mirror 4 are displaced by the predetermined angle $\theta_S$. With such a configuration, it is possible to separate the spots of the first and second excitation lights scanned on the sample M. As a result, it is possible to separate the first and second fluorescence beams guided to the first and second subunits 6a and 6b. Accordingly, it is possible to observe a plurality of fluorescence images while reducing bleed-through.

Further, in the confocal microscope unit 1A, the predetermined angle $\theta_S$ is set to an angle at which the Airy disc of the first excitation light and the Airy disc of the second excitation light on the sample M are separated. When such an angle is set, it is possible to completely separate the spots of the first and second excitation lights scanned on the sample M. As a result, it is possible to completely separate the first and second fluorescence beams guided to the first and second subunits 6a and 6b. Accordingly, it is possible to observe a plurality of fluorescence images while reducing bleed-through.

In the above-described embodiment, a MEMS mirror is adopted as the scan mirror 4. With such a configuration, it is possible to easily realize the miniaturization of the unit.

Further, in the confocal microscope unit 1A, the first subunit 6a and the second subunit 6b are fixed to the main housing 2 while being arranged in this order along the light guiding direction of the fluorescence formed by the scan mirror 4. With such a configuration, it is possible to irradiate the second excitation light irradiated from the second subunit 6b toward the sample M on the side of the microscope 50 via the first subunit 6a and to introduce the second fluorescence generated from the sample M in response to the second excitation light into the second subunit 6b via the first subunit 6a. As a result, it is possible to miniaturize a unit that realizes confocal imaging in a plurality of wavelength regions.

Second Embodiment

Figure 4:
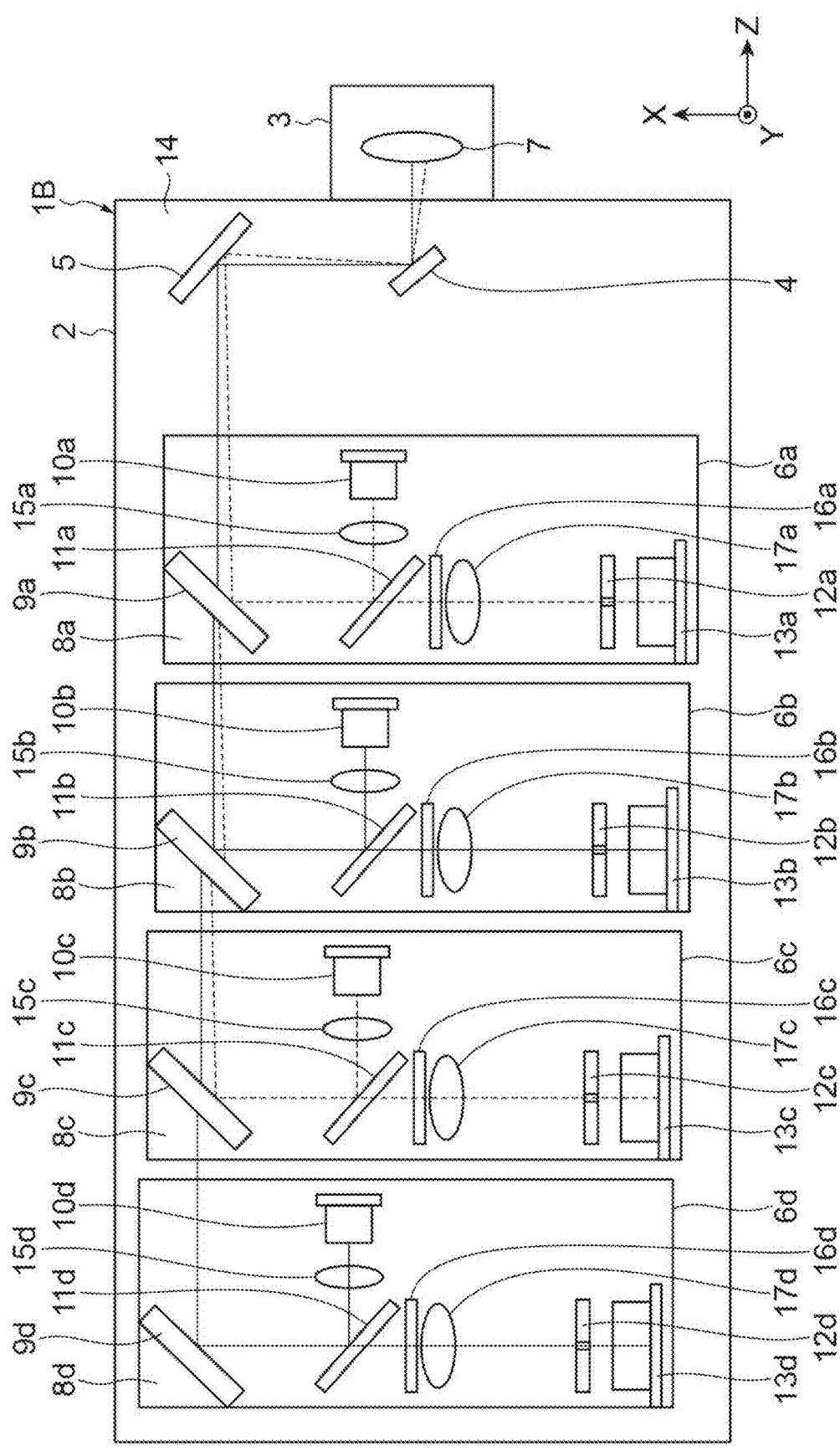
FIG. 4 is a schematic configuration diagram of a confocal microscope unit 1B according to a second embodiment.

FIG. 4 is a schematic configuration diagram of a confocal microscope unit 1B according to a second embodiment. The confocal microscope unit 1B shown in FIG. 4 is different from the confocal microscope unit 1A of the first embodiment in that four subunits are provided. Hereinafter, a configuration of the confocal microscope unit 1B will be described by focusing on the difference from the first embodiment.

That is, the confocal microscope unit 1B includes the first to fourth subunits 6a to 6d in the main housing 2.

The third subunit 6c includes a base plate 8c, a dichroic mirror (third optical mirror) 9c, a light source 10c, a collimated lens 15c, a dichroic mirror 11c, a barrier filter 16c, a condenser lens 17c, a pinhole plate (third aperture) 12c, and a photodetector (third photodetector) 13c.

The dichroic mirror 9c has a property of reflecting third excitation light of a wavelength $\lambda_3$ ($>\lambda_2$) irradiated by the third subunit 6c and third fluorescence of a wavelength range $\Delta\lambda_3$ generated from the sample M in response to the third excitation light and transmitting light of a wavelength longer than those of the third excitation light and the third fluorescence. The dichroic mirror 11c has a property of transmitting the third fluorescence of the wavelength range $\Delta\lambda_3$ and reflecting the third excitation light of the wavelength $\lambda_3$ shorter than the wavelength range $\Delta\lambda_3$. The light source 10c is a light emitting element which outputs the third excitation light of the wavelength $\lambda_3$. The collimated lens 15c converts the third excitation light output from the light source 10c into parallel light.

The barrier filter 16c is a filter member that is provided adjacent to the dichroic mirror 11c and cuts noise light other than the third fluorescence. The condenser lens 17c concentrates the third fluorescence transmitted through the barrier filter 16c on the pinhole of the pinhole plate 12c. The pinhole plate 12c is an aperture which is disposed so that a pinhole position coincides with a conjugate position of a spot of the third excitation light of the sample M and limits the luminous flux of the third fluorescence.

The photodetector 13c is disposed so that a detection surface is opposed to the pinhole plate 12c and receives and detects the third fluorescence having passed through the pinhole plate 12c. Additionally, the photodetector 13c is a photomultiplier tube, a photodiode, an avalanche photodiode, a multi-pixel photon counter (MPPC), a hybrid photo detector (HPD), an area image sensor, or the like.

The fourth subunit 6d includes a base plate 8d, a total reflection mirror (fourth optical mirror) 9d, a light source 10d, a collimated lens 15d, a dichroic mirror 11d, a barrier filter 16d, a condenser lens 17d, a pinhole plate (fourth aperture) 12d, and a photodetector (fourth photodetector) 13d.

The total reflection mirror 9d reflects fourth excitation light of a wavelength $\lambda_4$ ($>\lambda_3$) irradiated by the fourth subunit 6d and fourth fluorescence of a wavelength range $\Delta\lambda_4$ generated from the sample M in response to the fourth excitation light. The dichroic mirror 11d has a property of transmitting the fourth fluorescence of the wavelength range $\Delta\lambda_4$ and reflecting the fourth excitation light of the wavelength $\lambda_4$ shorter than the wavelength range $\Delta\lambda_4$. The light source 10d is a light emitting element which outputs the fourth excitation light of the wavelength $\lambda_4$. The collimated lens 15d converts the fourth excitation light output from the light source 10d into parallel light.

The barrier filter 16d is a filter member that is provided adjacent to the dichroic mirror 11d and cuts noise light other than the fourth fluorescence. The condenser lens 17d concentrates the fourth fluorescence transmitted through the barrier filter 16d on the pinhole of the pinhole plate 12d. The pinhole plate 12d is an aperture which is disposed so that a pinhole position coincides with a conjugate position of a spot of the fourth excitation light of the sample M and limits the luminous flux of the fourth fluorescence.

The photodetector 13d is disposed so that a detection surface is opposed to the pinhole plate 12d and receives and detects the fourth fluorescence having passed through the pinhole plate 12d. Additionally, the photodetector 13d is a photomultiplier tube, a photodiode, an avalanche photodiode, a multi-pixel photon counter (MPPC), a hybrid photo detector (HPD), an area image sensor, or the like.

The first to fourth subunits 6a to 6d are fixed into the main housing 2 so that the first to fourth subunits are arranged in this order along the light guiding direction (the Z-axis direction) of the first to fourth fluorescence formed by the scan mirror 4 and the fixed mirror 5 to be away from the fixed mirror 5 and the dichroic mirrors 9a to 9c and the total reflection mirror 9d are located on the optical paths of the first to fourth fluorescences. Specifically, the fourth subunit 6d is disposed to be shifted from the third subunit 6c in the X-axis direction based on the center positions of the dichroic mirror 9c and the total reflection mirror 9d. Further, the third and fourth subunits 6c and 6d are disposed to be also shifted from the first and second subunits 6a and 6b in the Y-axis direction based on the center positions of the dichroic mirrors 9a to 9c and the total reflection mirror 9d. Further, the installation angles of the dichroic mirrors 9a to 9c and the total reflection mirror 9d are set so that the first to fourth excitation lights reflected therefrom are incident on the center of the reflection surface of the scan mirror 4. With such an arrangement, the incident angles of two fluorescences incident from two adjacent subunits into the scan mirror 4 are set to be displaced from each other by the predetermined angle $\theta_S$ or more.

Figure 5:
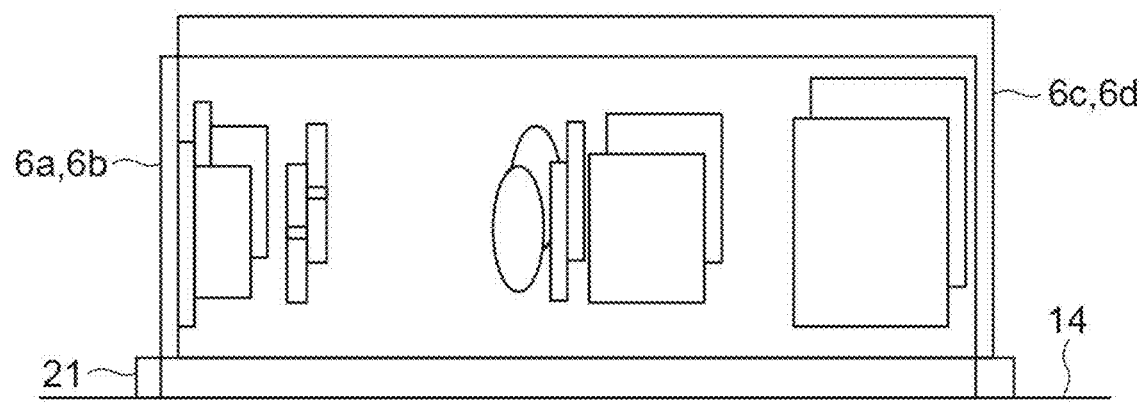
FIG. 5 is a perspective view showing an example of a structure for shifting the arrangement of third and fourth subunits 6c and 6d in a Y-axis direction.

FIG. 5 is a perspective view showing a structure for shifting the arrangement of the third and fourth subunits 6c and 6d in the Y-axis direction when viewed from the side of the lens barrel 3. In this way, in this embodiment, a structure is adopted in which a flat plate-shaped spacer 21 is disposed on the base plate 14 of the main housing 2 and the third and fourth subunits 6c and 6d are mounted on the spacer 21. With such a structure, the third and fourth subunits 6c and 6d may be disposed to be shifted from the first and second subunits 6a and 6b by a desired width in the Y-axis direction.

Figure 6:
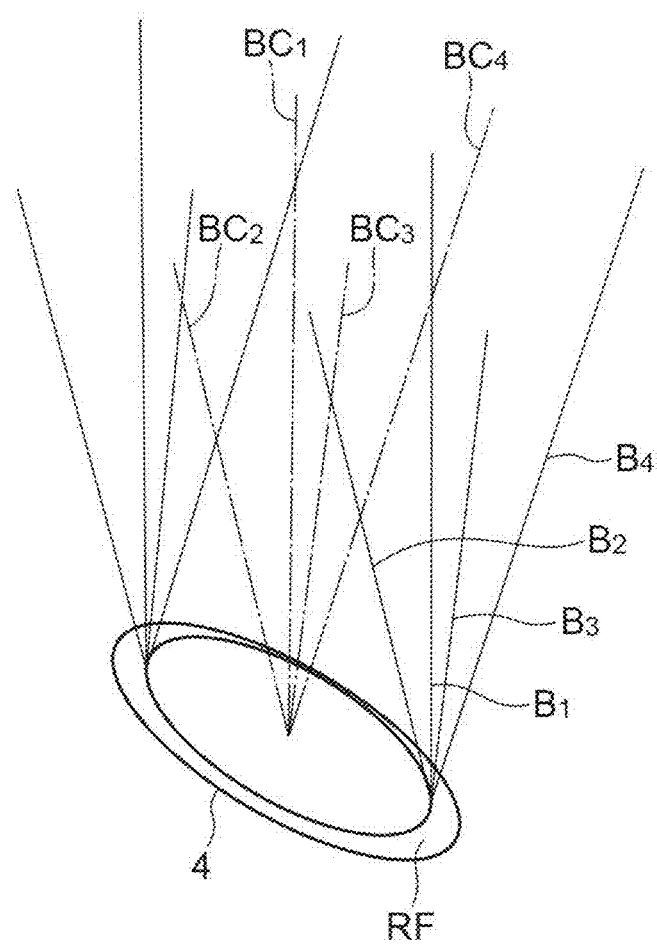
FIG. 6 is a diagram showing a trajectory of a luminous flux of an excitation light beam incident to a scan mirror 4 in the confocal microscope unit 1B.
Figure 7:
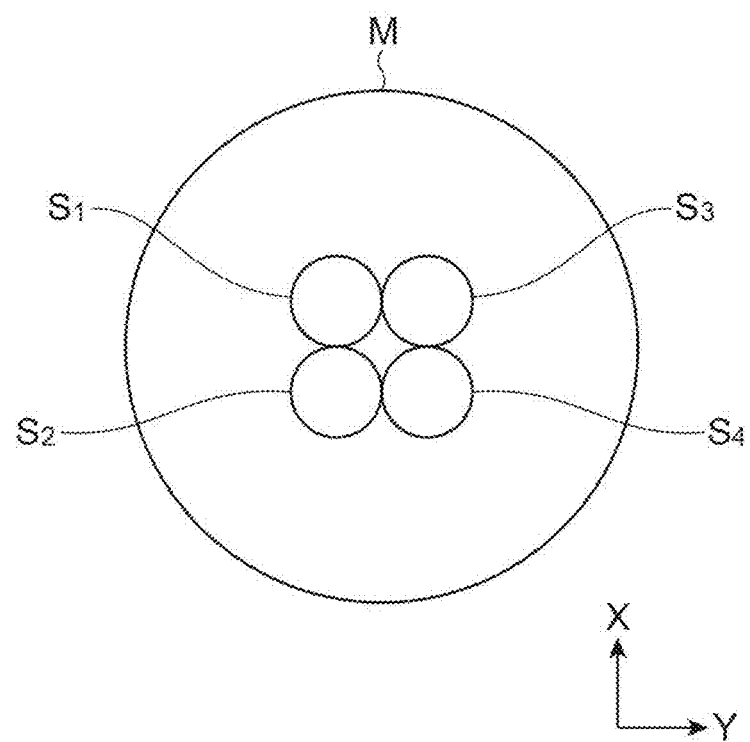
FIG. 7 is a diagram showing a distribution of a range of an Airy disc of a spot of excitation light on a sample M formed by the confocal microscope unit 1B.

FIG. 6 shows trajectories of the luminous fluxes $B_1$ to $B_4$ of the first to fourth excitation light beams incident from the first to fourth subunits 6a to 6d of the confocal microscope unit 1B to the scan mirror 4 and FIG. 7 shows a distribution of the ranges $S_1$ to $S_4$ of the Airy discs of the spots of the first to fourth excitation lights on the sample M formed by the confocal microscope unit 1B. In FIG. 6, the outer edges of the luminous fluxes $B_1$ to $B_4$ of the excitation light beams are indicated by the solid line and the centers $BC_1$ to $BC_4$ of the luminous fluxes $B_1$ to $B_4$ of the excitation light beams are indicated by the chain line. According to the confocal microscope unit 1B, the first to fourth excitation light beams are set to be incident to the center of the incident surface RF of the scan mirror 4 and the first to fourth excitation light beams are set so that the incident angles are two-dimensionally displaced from each other. Further, the ranges $S_1$ to $S_4$ of the Airy discs of the spots of the first to fourth excitation lights formed on the sample M are set not to overlap each other by displacing the incident angles by the predetermined angle $\theta_S$ or more.

According to the confocal microscope unit 1B of the above-described second embodiment, it is possible to separate the spots of the first to fourth excitation lights scanned on the sample M. As a result, it is possible to separate the first to fourth fluorescence beams guided to the first to fourth subunits 6a to 6d. Accordingly, it is possible to observe the fluorescence image while reducing bleed-through even when four kinds of excitation wavelengths are used.

Third Embodiment

Figure 8:
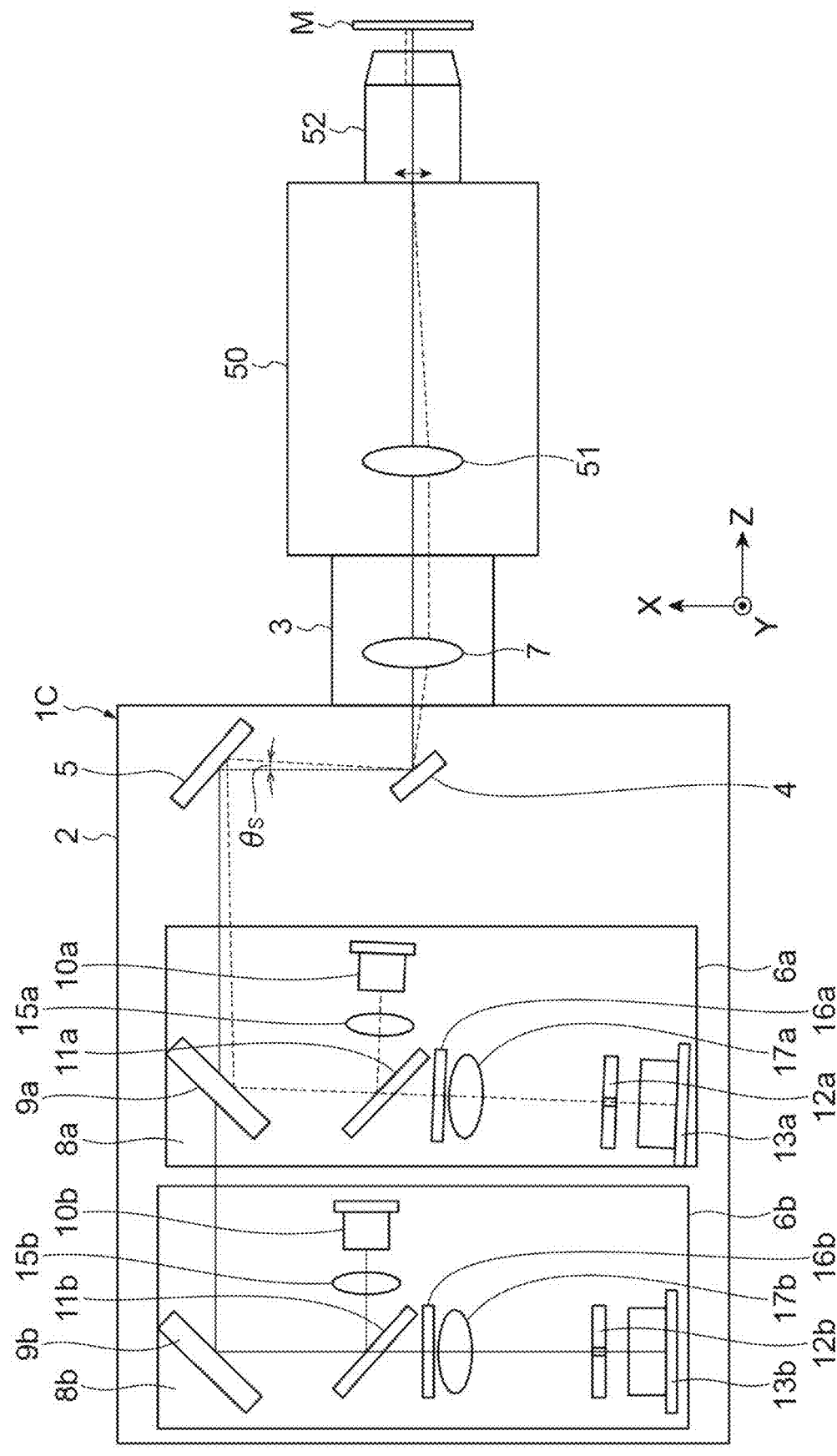
FIG. 8 is a schematic configuration diagram of a confocal microscope unit 1C according to a third embodiment.

FIG. 8 is a schematic configuration diagram of a confocal microscope unit 1C according to a third embodiment. The confocal microscope unit 1C shown in FIG. 8 is different from the confocal microscope unit 1A of the first embodiment in that the arrangement of the dichroic mirrors 9a and 9b on the base plates 8a and 8b of two subunits 6a and 6b is the same. Hereinafter, a configuration of the confocal microscope unit 1C will be described by focusing on the difference from the first embodiment.

The arrangement of the components other than the dichroic mirror 9a on the base plate 8a in the first subunit 6a, that is, the components including the light source 10a, the collimated lens 15a, the dichroic mirror 11a, the barrier filter 16a, the condenser lens 17a, the pinhole plate 12a, and the photodetector 13a based on the dichroic mirror 9a is adjusted to be different from the arrangement of the components other than the dichroic mirror 9b on the base plate 8b in the second subunit 6b, that is, the components including the light source 10b, the collimated lens 15b, the dichroic mirror 11b, the barrier filter 16b, the condenser lens 17b, the pinhole plate 12b, and the photodetector 13b based on the dichroic mirror 9b. For example, this adjustment is realized in such a manner that the components other than the dichroic mirror 9a in the first subunit 6a or the components other than the dichroic mirror 9b in the second subunit 6b can change the postures and positions together on the base plates 8a and 8b.

Specifically, the incident angle and the incident position of the first excitation light with respect to the dichroic mirror 9a in the first subunit 6a and the incident angle and the incident position of the second excitation light with respect to the dichroic mirror 9b in the second subunit 6b are set so that the incident angle of the first excitation light to the scan mirror 4 and the incident angle of the second excitation light to the scan mirror 4 are displaced from each other by the predetermined angle $\theta_S$ by the above-described configurations of the first and second subunits 6a and 6b.

According to the confocal microscope unit 1C of the above-described second embodiment, since the incident angles of the excitation lights with respect to the first and second dichroic mirrors 9a and 9b in the first and second subunits 6a and 6b are set, it is possible to separate the spots of the first and second excitation lights scanned on the sample M. As a result, it is possible to separate the first and second fluorescence beams guided to the first and second subunits 6a and 6b. Accordingly, it is possible to observe the fluorescence image in two fluorescence wavelengths while reducing bleed-through.

Although various embodiments of the present disclosure have been described above, the present disclosure is not limited to the above-described embodiments and may be modified without departing from the spirit of each claim or may be applied to other embodiments.

In the above-described embodiments, the pinhole plate is used as an aperture to form a confocal optical system, but may be, for example, an iris diaphragm, a fiber core, or the like if the aperture is any optical element that limits the luminous flux. When a fiber output type light source is used, the position of the end surface of the fiber core may be the aperture position (the position where the luminous flux is limited).

Further, in the above-described embodiments, a laser light source such as a solid-state laser or a diode laser can also be used. In this case, the position of the beam waist of these laser light sources may be set to the aperture position (the position where the luminous flux is limited) and the light source itself plays the role of the aperture.

In the above-described first to third embodiments, a plurality of subunits are arranged in order from the one having the shortest wavelength range of the excitation light and the fluorescence to be handled to be away from the side of the scan mirror 4, but may be arranged in order from the one having the longest wavelength range. However, in this case, the characteristics of the dichroic mirrors 9a to 9c are set to the characteristics in which the excitation light and the fluorescence having a relatively long wavelength handled by each of the subunits 6a to 6c are reflected and the excitation light and the fluorescence having a relatively short wavelength handled by the other subunits are transmitted.

In the above-described second embodiment, the spots of the excitation lights formed on the sample M between two subunits among all subunits 6a to 6d are formed not to overlap each other, but the spots between the adjacent subunits may be formed not to overlap each other. For example, the spots of the excitation lights may be formed not to overlap each other between the first subunit 6a and the second subunit 6b, between the second subunit 6b and the third subunit 6c, and between the third subunit 6c and the fourth subunit 6d. In contrast, the spots of the excitation lights between the first subunit 6a and the third subunit 6c or between the second subunit 6b and the fourth subunit 6d may overlap each other. Also in this case, the dichroic mirror can easily separate the fluorescence to be observed in one subunit and the fluorescence to be observed in the other subunit. As a specific configuration, in the confocal microscope unit 1B according to the second embodiment, the third and fourth subunits 6c and 6d may be disposed not to be displaced from the first and second subunits 6a and 6b in the Y-axis direction. Also in such a configuration, since two spots of excitation lights having similar wavelength regions can be separated on the sample M, it is possible to prevent the influence between the fluorescence beams having a plurality of wavelength ranges to be detected and to observe a plurality of fluorescence images while reducing bleed-through.

In the above-described embodiments, the first subunit may include the first optical mirror configured to reflect the first excitation light and the first fluorescence and transmit the second excitation light and the second fluorescence, the second subunit may include the second optical mirror configured to reflect the second excitation light and the second fluorescence, and the first optical mirror and the second optical mirror may be disposed in the main housing so that the incident angle of the first excitation light to the scan mirror is displaced from the incident angle of the second excitation light to the scan mirror by a predetermined angle. Accordingly, it is possible to separate the spots of the first and second excitation lights scanned on the sample by setting the arrangement of the first and second optical mirrors in the main housing. As a result, it is possible to separate the first and second fluorescence beams guided to the first and second subunits. Accordingly, it is possible to observe a plurality of fluorescence images while reducing bleed-through.

Further, the first subunit may include the first optical mirror configured to reflect the first excitation light and the first fluorescence and transmit the second excitation light and the second fluorescence, the second subunit may include the second optical mirror configured to reflect the second excitation light and the second fluorescence, and in the first subunit and the second subunit, the incident angle of the first excitation light to the first optical mirror and the incident angle of the second excitation light to the second optical mirror may be set so that the incident angle of the first excitation light to the scan mirror is displaced from the incident angle of the second excitation light to the scan mirror by a predetermined angle. In this case, it is possible to separate the spots of the first and second excitation lights scanned on the sample by setting the incident angles of the excitation lights with respect to the first and second optical mirrors in the first and second subunits. As a result, it is possible to separate the first and second fluorescence beams guided to the first and second subunits. Accordingly, it is possible to observe a plurality of fluorescence images while reducing bleed-through.

Further, it is preferable that the above-described predetermined angle be an angle at which the Airy disc of the first excitation light and the Airy disc of the second excitation light on the sample are separated from each other. With such an angle, it is possible to completely separate the spots of the first and second excitation lights scanned on the sample. As a result, it is possible to completely separate the first and second fluorescence beams guided to the first and second subunits. Accordingly, it is possible to observe a plurality of fluorescence images without bleed-through.

In the above-described embodiments, the scan mirror may be a MEMS mirror. In this case, the miniaturization of the device can be easily realized.

Further, the first subunit and the second subunit may be fixed to the main housing while being arranged in order of the first subunit and the second subunit along the light guiding direction of the fluorescence formed by the scan mirror. According to such a configuration, it is possible to irradiate the second excitation light irradiated from the second subunit toward the sample on the side of the microscope via the first subunit and to introduce the second fluorescence generated from the sample in response to the second excitation light into the second subunit via the first subunit. As a result, it is possible to miniaturize a device that realizes imaging in a plurality of wavelength regions.

INDUSTRIAL APPLICABILITY

In the embodiments, it is possible to realize fluorescence imaging by a plurality of fluorescences while reducing bleed-through by a simple configuration in a confocal microscope unit constituting a confocal microscope and a confocal microscope.

REFERENCE SIGNS LIST

M: sample, P1: connection port, $\theta_S$: predetermined angle, 10a to 10d: light sources, 12a to 12d: pinhole plates (apertures), 13a to 13d: photodetectors, 6a to 6d: first to fourth subunits, 9a to 9c: dichroic mirrors (first to third optical mirrors), 9d: total reflection mirror (fourth optical mirror), 1A, 1B, 1C: confocal microscope unit, 2: main housing, 3: lens barrel, 4: scan mirror, 7: scan lens, 50: microscope, 101: confocal microscope.

The invention claimed is:

1. A confocal microscope unit attached to a connection port of a microscope including a microscope optical system to constitute a confocal microscope, the confocal microscope unit comprising:
a first subunit including a light source outputting first excitation light, a first aperture limiting a luminous flux of first fluorescence generated from a sample to be observed in response to the first excitation light, and a first photodetector detecting the first fluorescence having passed through the first aperture;
a second subunit including a light source outputting second excitation light, a second aperture limiting a luminous flux of second fluorescence generated from the sample in response to the second excitation light, and a second photodetector detecting the second fluorescence having passed through the second aperture;
a scan mirror configured to scan the excitation light output from the first and second subunits on the sample via the microscope optical system and guide the fluorescence generated from the sample in response to the excitation light to the first and second subunits; and
a main housing configured to be attachable to the connection port and to which the scan mirror, the first subunit, and the second subunit are fixed, wherein
the first subunit includes a first optical mirror configured to reflect the first excitation light and the first fluorescence and transmit the second excitation light and the second fluorescence,
the second subunit includes a second optical mirror configured to reflect the second excitation light and the second fluorescence, and
the first subunit and the second subunit are disposed in the main housing so that an incident angle of the first excitation light to the scan mirror is displaced from an incident angle of second excitation light to the scan mirror by a predetermined angle, as a result of a disposition of the second subunit to be shifted from the first subunit in a direction perpendicular to a light guiding direction of the first fluorescence toward the first optical mirror based on center positions of the first and second optical mirrors.

2. The confocal microscope unit according to claim 1, wherein the first optical mirror and the second optical mirror are disposed in the main housing so that the incident angle of the first excitation light to the scan mirror is displaced from the incident angle of second excitation light to the scan mirror by a predetermined angle.

3. The confocal microscope unit according to claim 2, wherein the predetermined angle is an angle at which an Airy disc of the first excitation light and an Airy disc of the second excitation light on the sample are separated from each other.

4. The confocal microscope unit according to claim 1, wherein in the first subunit and the second subunit, an incident angle of the first excitation light to the first optical mirror and an incident angle of second excitation light to the second optical mirror are set so that the incident angle of the first excitation light to the scan mirror is displaced from the incident angle of second excitation light to the scan mirror by a predetermined angle.

5. The confocal microscope unit according to claim 4, wherein the predetermined angle is an angle at which an Airy disc of the first excitation light and an Airy disc of the second excitation light on the sample are separated from each other.

6. The confocal microscope unit according to claim 1, wherein the predetermined angle is an angle at which an Airy disc of the first excitation light and an Airy disc of the second excitation light on the sample are separated from each other.

7. The confocal microscope unit according to claim 1, wherein the scan mirror is a MEMS mirror.

8. The confocal microscope unit according to claim 1, wherein the first subunit and the second subunit are fixed to the main housing while the first subunit and the second subunit are arranged in this order along a light guiding direction of the fluorescence formed by the scan mirror.

9. A confocal microscope comprising:
the confocal microscope unit according to claim 1; and
a microscope with a connection port to which the microscope optical system and the confocal microscope unit are attached.

* * * * *